United States Patent [19]
McCormick

[11] 3,806,851
[45] Apr. 23, 1974

[54] ELECTRIC SWITCH FOR A RADIAL READOUT GAUGE

[76] Inventor: John P. McCormick, 521 Hilmar St., Santa Clara, Calif. 95050

[22] Filed: May 9, 1973

[21] Appl. No.: 358,796

[52] U.S. Cl. .............................................. 335/205
[51] Int. Cl. ........................................... H01h 53/06
[58] Field of Search ..................... 335/205, 206, 207

[56] References Cited
UNITED STATES PATENTS
3,559,062  1/1971  Wright ............................ 335/205 X
3,258,554  6/1966  Cloup ............................. 335/206 X Primary Examiner—Roy N. Envall, Jr.
Attorney, Agent, or Firm—John N. Randolph

[57] ABSTRACT

An electric switch mounted as an attachment to a radial readout gauge, including a permanent magnet carried by or forming a part of the gauge pointer and which is movable over a graduated scale of the dial face. The magnet of the pointer is capable of moving into a position for closing or opening an electric circuit controlled by the switch. The electric switch includes a knob which is rotatably adjustable over the dial face and which includes a switch located to be actuated by movement of the magnet to a position in proximity thereto for either closing or interrupting the electric circuit controlled by the switch.

4 Claims, 3 Drawing Figures

ELECTRIC SWITCH FOR A RADIAL READOUT GAUGE

SUMMARY

It is a primary object of the present invention to provide an electric switch for controlling an electric circuit, which may be mounted for rotative adjustment over the dial face of a radial readout gauge, and which includes a knob carrying a triac triggered by a reed switch which is located to be actuated by a permanent magnet carried by the pointer of the gauge, when said pointer is moved to a predetermined position relative to a graduated scale of the dial face, in response to a condition being monitored by the gauge, for actuating the triac by closing of the reed switch, for either opening or closing a circuit controlled by the triac.

A further object of the invention is to provide an electric switch for use with a radial readout gauge including a knob carrying a reed switch which can be of a very small size capable of carrying only a few milliamps sufficient to trigger a triac, also carried by the knob, into conduction, for carrying ten amps or more at 220 volts, which far exceeds the capacity of existing reed switches.

Still a further object of the invention is to provide an attachment of extremely simple construction which may be very economically manufactured and sold and readily applied to a conventional readout gauge utilized, for example, as a tensiometer, and operated by a single permanent magnet carried by the gauge pointer.

Various other objects and advantages of the invention will hereinafter become more fully apparent from the following description of the drawing, illustrating a presently preferred embodiment thereof, and wherein:

DESCRIPTION OF THE PREFERRED EMBODIMENT

Figure 1:
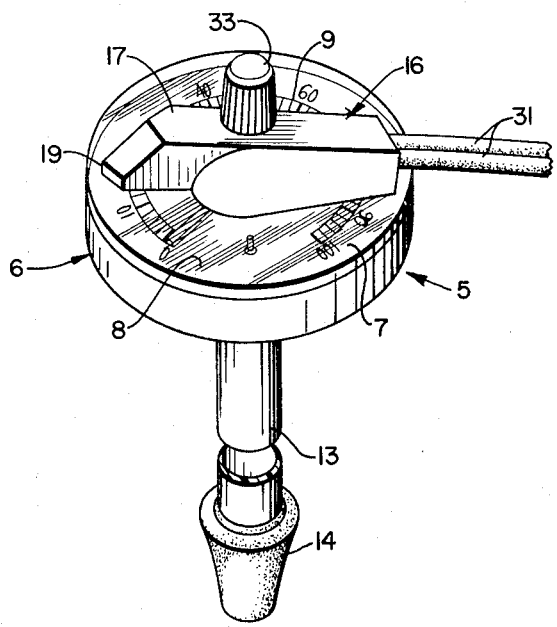
FIG. 1 is a perspective view, partly broken away, of a radial readout gauge equipped with an electric switch comprising the invention.
Figure 2:
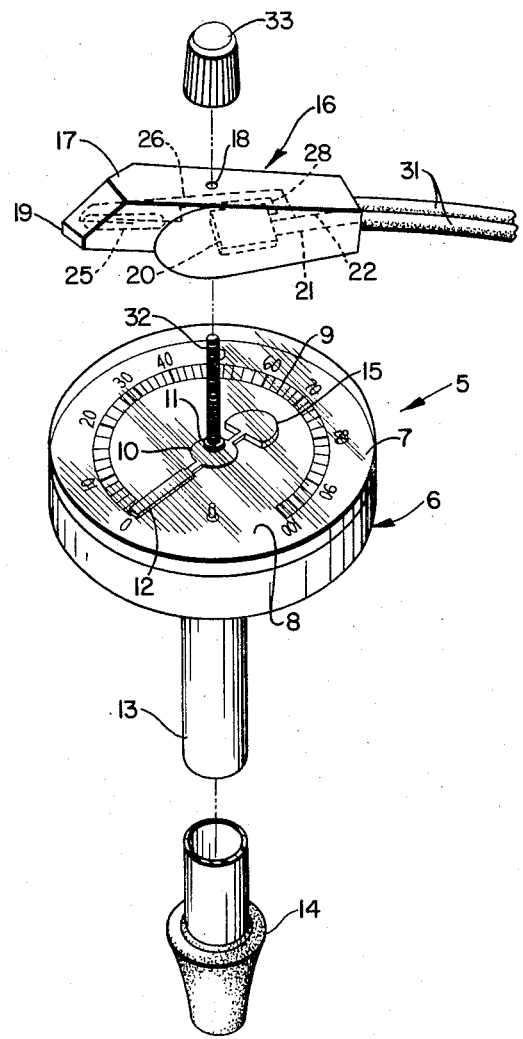
FIG. 2 is an exploded view similar to FIG. 1.
Figure 3:
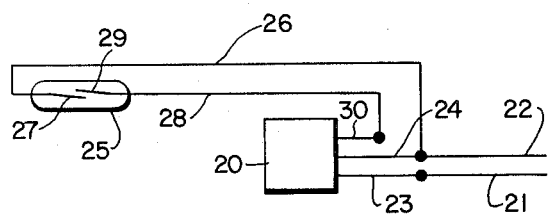
FIG. 3 is a diagramatic view illustrating the electric circuit of the switch.

Referring more specifically to the drawing, FIGS. 1 and 2 illustrate a radial readout gauge, designated generally 5, including a housing 6 having a lens 7, constituting a transparent top wall thereof, which is disposed over a dial face 8 having a graduated scale 9 thereon which is visible through the lens 7. A pointer 10 is rotatively mounted over the dial face 8 and beneath the lens 7 about a centrally disposed vertical axis 11 in the form of a post which rises from the dial face. The graduated scale 9 is disposed concentrically around the post 11, and an end 12 of said pointer is disposed for movement over the scale 9.

The radial readout gauge 5, as illustrated, constitutes a tensiometer and includes a substantially rigid tube 13, having an upper end connected to the housing 6 and a lower end which opens into a permeable tip 14, preferably in the form of a ceramic cup.

The pipe or tube 13 is filled with water. With the tube 13 and tip 14 buried in the ground, the gauge 5 will function in a conventional manner to visually indicate the moisture in the earth immediately surrounding the cup 14.

The parts previously described constitute a conventional readout gauge which is modified only to the extent that the pointer end 12 constitues a permanent magnet and the opposite end of the pointer 10 may be enlarged to provide a counterweight 15 for said magnet, and the post 11 is extended upwardly through the lens 7 and terminates substantially thereabove.

In addition to the magnet 12, the electric switch, designated generally 16, includes an elongated knob 17 formed of an electrical insulating material, such as a plastic, having a bore 18 extending from top to bottom therethrough, nearly midway of its ends, to receive the post 11, when the knob 17 is applied thereto to rest on the lens 7. An end 19 of the knob 17 is tapered to form a pointer which sweeps the scale 9 when the knob is rotated about the post 11. A triac or three-electrode AC semi-conductor switch 20 is embedded in the knob 17. Two conductors 21 and 22 lead from a conventional current source and connect with terminals 23 and 24, respectively, of two of the electrodes of the triac 20.

A reed switch 25 is also embedded in the knob 17, longitudinally thereof and adjacent the pointer end 19, and has a conductor 26 leading from one blade 27 thereof which is connected to the electrode terminal 24. A conductor 28 extends from the other blade 29 of the reed switch 25 and connects with the terminal 30 of the third electrode of the triac 20. The terminals 23, 24 and 30, the conductors 26 and 28 and the portions of the conductors 21 and 22, located adjacent the triac 20, are also embedded in the knob 17. The remainder of the conductors 21 and 22 which lead from the end of the knob 17, disposed remote from its pointer end 19, are encased in tubing 31 of electrical insulating material.

At least the upper end of the post 11 is threaded, as seen at 32, to receive a thumb nut 33 for retaining the knob 17 detachably thereon. The thumb nut 33 also cooperates with the lens 7 to provide means for clamping the knob 17 in any rotatively adjusted position desired relative to the scale 9.

From the foregoing, it will be apparent that when the tube 13 and the cup 14 are buried in the earth, the pointer 10 will oscillate about the post 11 in response to variations in the pressure within the tube 13 due to changes in the moisture content of the earth surrounding the cup 14, to cause the pointer end 12 to sweep the scale 9. The pointer 19 of the knob 17 would normally be disposed over a graduation of the scale 9 representing a below normal moisture content of the earth, so that when the permanent magnet, constituting the pointer end 12, moved to a position in alignment with the knob pointer 19 it would be beneath the reed switch 25, to thereby effect a closing of the reed switch by movement of its contacts 27 and 29 into engagement with one another, to thus produce a gate signal for triggering the triac into conduction, for bridging the gap between the electrodes connected to the terminals 23 and 24 for completing or interrupting the circuit through the conductors 21 and 22.

A solenoid, not shown, for example, could be interposed in the circuit of the conductors 21 and 22 to be thereby energized or deenergized for opening a valve to supply water for replenishing the moisture in the earth adjacent to the gauge 5.

Various modifications and changes are contemplated and may be resorted to without departing from the function or scope of the invention.

I claim as my invention:

1. In combination with a radial readout gauge having a housing provided with a dial face, a lens covering the dial face, a pointer pivoted at the center of the dial face for oscillation thereover and beneath the lens, a graduated scale on the dial face over which an end of the pointer is disposed to sweep; an electric switch including an elongated knob of electrical insulating material, means for mounting said knob for rotative adjustment on said lens and relative to said scale, a triac carried by said knob, conductors of an electric circuit connected to electrode terminals of said triac, a reed switch carried by said knob, conductors connecting the contacts of the reed switch to electrode terminals of the triac, and a permanent magnet comprising said pointer end and movable in response to a condition being monitored by the radial readout gauge, for causing said magnet to close the reed switch for triggering the triac into conduction to effect the closing or opening of the electric circuit when the permanent magnet assumes a position in close proximity to said reed switch.

2. In a combination as defined by claim 1, said reed switch being disposed adjacent one end of the knob and longitudinally thereof.

3. In a combination as defined by claim 2, and means for clamping the knob immovably relative to the dial face and with said reed switch extending radially across a selective graduation of the scale.

4. In a combination as defined by claim 1, said knob being formed of a plastic and said triac, reed switch and conductors being embedded in the knob.

* * * * *